(12) United States Patent
Hiscock

(10) Patent No.: US 9,160,590 B2
(45) Date of Patent: Oct. 13, 2015

(54) DIVERSITY WITH A CODED SIGNAL

(71) Applicant: Cambridge Silicon Radio Limited, Cambridge (GB)

(72) Inventor: Paul Dominic Hiscock, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 13/712,807

(22) Filed: Dec. 12, 2012

(65) Prior Publication Data

US 2014/0161165 A1    Jun. 12, 2014

(51) Int. Cl.
*H04L 1/24*     (2006.01)
*H04L 27/26*    (2006.01)
*H04L 27/38*    (2006.01)

(52) U.S. Cl.
CPC ............ *H04L 27/2601* (2013.01); *H04L 27/38* (2013.01)

(58) Field of Classification Search
CPC ....................................................... H04B 1/69
USPC ............... 375/139, 267, 130; 455/39, 561
See application file for complete search history.

(56) References Cited

U.S. PATENT DOCUMENTS

| | | | |
|---|---|---|---|
| 4,037,159 A | | 7/1977 | Martin |
| 5,504,783 A | * | 4/1996 | Tomisato et al. ............. 375/267 |
| 6,628,697 B1 | * | 9/2003 | Douglas et al. .............. 375/139 |
| 7,068,704 B1 | * | 6/2006 | Orr ................................ 375/139 |
| 7,844,299 B2 | * | 11/2010 | Atarashi et al. .............. 455/561 |
| 2003/0133496 A1 | * | 7/2003 | Hooton ......................... 375/139 |
| 2004/0213330 A1 | | 10/2004 | Jung |
| 2005/0018752 A1 | | 1/2005 | Anglin |
| 2005/0069020 A1 | * | 3/2005 | Lakkis .......................... 375/130 |
| 2006/0133544 A1 | * | 6/2006 | Kawada et al. ............... 375/343 |
| 2009/0305629 A1 | * | 12/2009 | Izumi et al. ..................... 455/39 |

FOREIGN PATENT DOCUMENTS

| | | |
|---|---|---|
| CN | 102664687 | 9/2012 |
| GB | 2490140 | 10/2012 |

OTHER PUBLICATIONS

Search Report issued May 30, 2014 in corresponding GB1300753.9.

* cited by examiner

*Primary Examiner* — Eva Puente

(57) ABSTRACT

A communications device configured to generate a first diversity signal comprising: a first single coded signal spanning a first frequency sub-band, and a second single coded signal contemporaneous with the first single coded signal spanning a second frequency sub-band offset from the first frequency sub-band such that the total bandwidth of the first diversity signal is greater than the bandwidths of either of the first and second frequency sub-bands alone; and a signal transmitter configured to transmit the first diversity signal to a first counterpart communications device; the first and second single coded signals each having properties such that, after undergoing a procedure comprising being: transmitted, received, shifted into a receiver frequency sub-band spanning a narrower bandwidth than the total bandwidth of the first diversity signal, and cross-correlated with a replica signal based on the transmitted signal, a single significant peak corresponding to the most direct transmission path is produced.

19 Claims, 7 Drawing Sheets

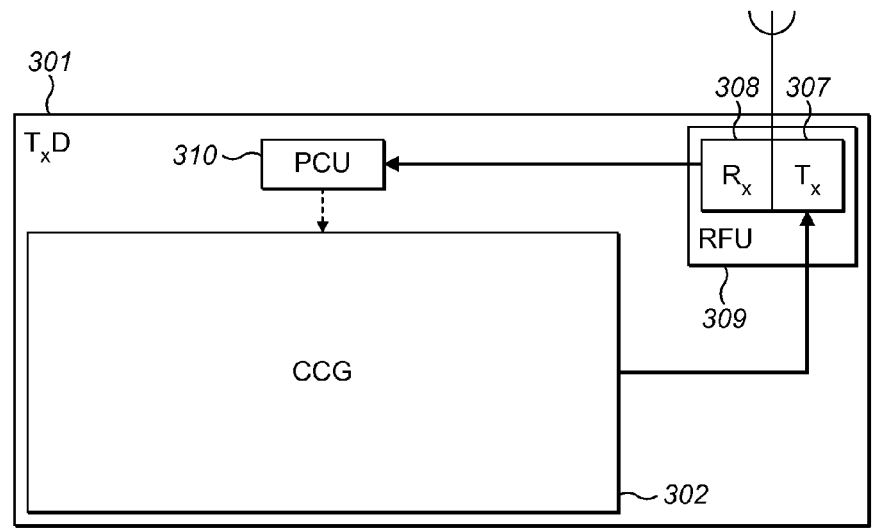
FIG. 3
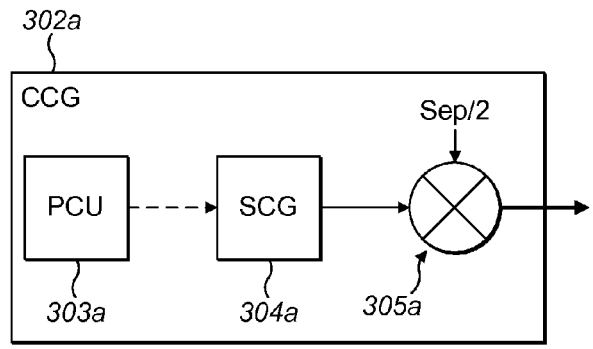
FIG. 3(a)
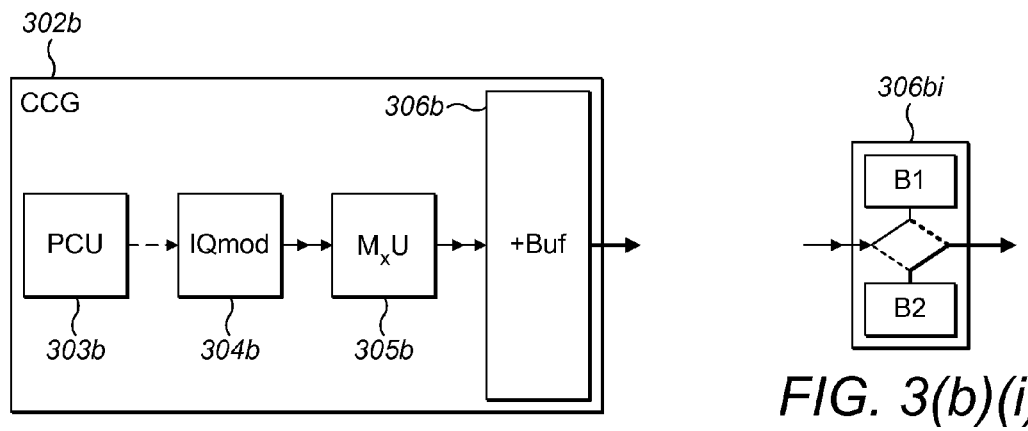
FIG. 3(b)
FIG. 3(b)(i)

Initial single chirp signal
$2A\exp[j\omega t]$

Compound chirp signal for transmission
$A\exp[j(\omega-\omega_s)t]+A\exp[j(\omega+\omega_s)t]$ Received compound chirp signal
$A_1\exp[j(\omega-\omega_s)t]+A_2\exp[j(\omega+\omega_s)t]$ Output of receive processing
$\frac{1}{2}A_1\exp[-j\omega t]+\frac{1}{2}A_2\exp[j\omega t]$

DIVERSITY WITH A CODED SIGNAL

FIELD OF THE INVENTION

The present invention relates to improving the quality of communications. More specifically, the invention relates to mitigating the effects of fading and/or interference in communications using diversity signals.

BACKGROUND OF THE INVENTION

A well understood problem in the field of telecommunications is that of the quality of a received signal being poor due to local fading and/or interference. Fading can occur in environments where the transmitted signal is reflected in a variety of locations and directions and therefore takes multiple paths between the transmitter and receiver. Where the multipath reflections interfere with one another destructively there is a fade. The location of fades varies with the frequency of the carrier wave used in the transmitted signal. Fading can be a serious problem for narrowband communication systems. (In narrowband systems the bandwidth of a message does not significantly exceed the coherence bandwidth of the channel it is transmitted on. This implies that the channel under consideration is sufficiently narrow that its frequency response can be considered flat.) Interference arises when transmitters within range of a communications device transmit in the same frequency band at the same time as the communications device (or another communications device the first communications device is attempting to listen to).

One method of addressing this problem is to implement frequency hopping. In a frequency hopping system a baseband signal is frequency-mixed up to a variety of radio frequency (RF) channels in a sequence that is known to both the transmitter and receiver so that they "hop" between different channel frequencies. The effects of fading and interference are then diluted as only some of the hop frequencies will be affected. Interleaving and forward error correction (FEC) are used to average out these effects and produce a useful wireless connection. However, in low cost and low power systems, or when short packet lengths are used, interleaving, frequency hopping and FEC may require undesirably large quantities of electrical and/or processing power.

Another way of addressing the fading problem is to employ multiple antennas, spatially separated. The receiver determines which antenna is presently receiving the best signal and preferentially receives with that antenna. However, where small size and/or low cost are important design aims, for example in mobile devices and/or long range chirp communication devices, the additional antenna, receiving circuit, and requisite processing power may not be desirable.

Orthogonal Frequency-Division Multiplexing (OFDM) is sometimes used to address frequency-dependent fading. In OFDM several orthogonal sub-carrier tone signals are used to carry data on parallel data streams or channels. However the composite signals used in OFDM, although composed of narrowband signals, are in fact wideband. Such wideband signals require a faster clock (and hence more circuitry and power) in the receiver than narrowband signals.

What is needed is a communications device, system and method for communications that reduces the effects of fading and/or interference without the disadvantages of the prior art discussed above.

SUMMARY OF THE INVENTION

Embodiments of the invention relate to mitigating the effects of fading and/or interference in communications using diversity signals. Further, an aspect of the invention relates to a method of transmitting and receiving diversity signals, wherein a diversity signal comprises a plurality of single coded signals at different frequencies transmitted contemporaneously, and a system and apparatus for carrying out said method.

According to a first aspect of the invention, there is provided a communications device for diversity communications comprising: a diversity signal generator configured to generate a first diversity signal, said first diversity signal comprising: a first single coded signal spanning a first frequency sub-band, and a second single coded signal contemporaneous with the first single coded signal and spanning a second frequency sub-band offset from the first frequency sub-band such that the total bandwidth of the first diversity signal is greater than the bandwidths of either of the first and second frequency sub-bands alone; and a signal transmitter configured to transmit the first diversity signal to a first counterpart communications device; said first and second single coded signals each being such that, after undergoing a procedure comprising being: transmitted, received, shifted into a receiver frequency sub-band spanning a narrower bandwidth than the total bandwidth of the first diversity signal, and cross-correlated with a replica signal that is based on the transmitted signal a single significant peak corresponding to the most direct transmission path is produced.

The first and second single coded signals may have substantially the same durations.

The first and second single coded signals may be chirps. They may have gradients of the same magnitude and opposite signs, or they may have gradients of the same magnitude and sign.

For one of the first and second single coded signals said procedure may further comprise conjugation. The said one of the first and second single coded signals may be substantially orthogonal to its own conjugate.

For one of the first and second single coded signals said procedure may further comprise discarding the imaginary part of a complex signal.

The first and second single coded signals may be chirps having different cyclic shifts. The difference in cyclic shift between the first and second single coded signals may be a quarter of a cycle.

The first and second single coded signals may be simultaneous.

The first diversity signal may be made up of only two single coded signals.

The diversity signal generator may comprise a frequency mixer configured to mix an initial coded signal with an intermediate frequency Sep/2 such that a compound coded signal is produced comprising the initial coded signal frequency-shifted by plus and minus Sep/2.

The communications device may further comprise: a message receiver operable to receive messages from the first counterpart communications device; and a control unit responsive to said message receiver and operable to control the diversity signal generator and/or signal transmitter, configured to, if a message is received from the first counterpart communications device indicating that: subsequent transmissions to that first counterpart communications device should not include signals in either (i) the first frequency sub-band, or (ii) the second frequency sub-band; or following the implementation of such an instruction, the currently claimed communications device should resume transmission across both the first and second frequency sub-bands; control the diversity signal generator and/or signal transmitter to follow the instructions given in the received message.

The signal transmitter may be configured to, following the receipt of an instruction to resume transmission across both the first and second frequency sub-bands, transmit one or more calibration diversity signals before transmitting any payload diversity signals.

According to a second aspect of the invention there is provided a communications device for diversity communications comprising: a diversity signal receiver configured to receive a second diversity signal transmitted by a second counterpart communication device, said second diversity signal comprising: a third single coded signal spanning a third frequency sub-band, and a fourth single coded signal having been transmitted contemporaneously with the third single coded signal and spanning a fourth frequency sub-band offset from the third frequency sub-band such that the total bandwidth of the second diversity signal is greater than the bandwidths of either of the third and fourth frequency sub-bands alone; said third and fourth single coded signals each being such that, after undergoing a procedure comprising being: received, shifted into a receiver frequency sub-band spanning a narrower bandwidth than the total bandwidth of the first diversity signal, and cross-correlated with a replica signal that is based on the transmitted signal, a single significant peak corresponding to the most direct transmission path is produced.

The third and fourth single coded signals may have substantially the same durations.

The third and fourth single coded signals may be chirps. They may have gradients of the same magnitude and opposite signs, or they may have gradients of the same magnitude and sign.

For one of the third and fourth single coded signals said procedure may further comprise conjugation. The said one of the third and fourth single coded signals may be substantially orthogonal to its own conjugate.

For one of the third and fourth single coded signals said procedure may further comprise discarding the imaginary part of a complex signal.

The third and fourth single coded signals may be chirps having different cyclic shifts. The difference in cyclic shift between the third and fourth single coded signals may be a quarter of a cycle.

The third and fourth single coded signals may be simultaneous.

The second diversity signal may be made up of only two single coded signals.

The communications device may further comprise a mixer unit configured to: receive the second diversity signal or a signal derived from said second diversity signal; and output a signal comprising: a component derived from the third single coded signal multiplied by a first weighting factor, and a component derived from the fourth single coded signal multiplied by a second weighting factor.

The first and second weighting factors may each take a continuous range of values from zero to one.

The first and second weighting factors may each respectively take only the value zero or the value one.

The mixer unit may comprise: a signal modifier configured to operate in a mode selected from: (i) third band mode, in which the signal modifier is configured to output the second diversity signal or signal derived from said second diversity signal unchanged; (ii) fourth band mode, in which the signal modifier is configured to output the conjugate of the second diversity signal or signal derived from said second diversity signal; and (iii) combined mode, in which the signal modifier is configured to output only the real part of the second diversity signal or signal derived from said second diversity signal; a mixer configured to output: the output of the signal modifier mixed by half the offset between the third and fourth frequency sub-bands; and a filter configured to output only signals within a certain frequency band such that: when the signal modifier operates in third band mode, the filter outputs a signal derived from only the third single coded signal; when the signal modifier operates in fourth band mode, the filter outputs a signal derived from only the fourth single coded signal; and when the signal modifier operates in combined mode, the filter outputs a signal having components derived from both the third and fourth single coded signals.

The first and second weighting factors may be determined according to one or more measurements of channel quality on the third and fourth frequency sub-bands respectively.

The communications device may further comprise a correlating unit comprising: a first correlator configured to output a first set of correlation results formed by correlating the output of the mixer unit with a single coded signal substantially identical to the transmitted version of the third single coded signal; and a second correlator configured to output a second set of correlation results formed by correlating the output of the mixer unit with a single coded signal substantially identical to the conjugate of the transmitted version of the third single coded signal.

The second correlator may be the first correlator.

The communications device may further comprise a processor configured to measure the channel quality on the third and/or fourth frequency sub-bands by analyzing the first and/or second sets of correlation results respectively.

The processor may be configured to measure the channel quality on the third and/or fourth frequency sub-bands by calculating respective signal to noise ratios on the third and/or fourth frequency sub-bands.

The communications device may further comprise a first controller responsive to the processor and operable to control the mixer unit, configured to: (i) if the channel quality on the third frequency sub-band is determined to be greater than or equal to a first predetermined threshold value higher than the channel quality on the fourth frequency sub-band, control the mixer unit to operate in third band mode; and/or (ii) if the channel quality on the fourth frequency sub-band is determined to be greater than or equal to the first predetermined threshold value higher than the channel quality on the third frequency sub-band, control the mixer unit to operate in fourth band mode; and/or (iii) if the channel qualities on the third and fourth frequency sub-bands are determined to be within the first predetermined threshold value of each other, control the mixer unit to operate in combined mode.

The first controller may be configured to, after the expiration of a predetermined time period from the determination of the channel qualities on the third and fourth frequency sub-bands, and/or in response to the processor determining that the quality of the received signal has fallen below a second predetermined threshold level, control the mixer unit to operate in combined mode.

The communications device may further comprise a second controller responsive to the processor and operable to control the signal receiver, configured to: (i) if the channel quality on the third frequency sub-band is determined to be greater than or equal to a first predetermined threshold value higher than the channel quality on the fourth frequency sub-band, control the signal receiver to subsequently not output signals received in the fourth frequency sub-band; and/or (ii) if the channel quality on the fourth frequency sub-band is determined to be greater than or equal to the first predetermined threshold value higher than the channel quality on the third frequency sub-band, control the signal receiver to subsequently not output signals received in the third frequency sub-band; and/or (iii) if the channel qualities on the third and fourth frequency sub-bands are determined to be within the first predetermined threshold value of each other, control the signal receiver to subsequently output signals received in both the third and fourth frequency sub-bands.

The second controller may be configured to, after the expiration of a predetermined time period from the determination of the channel qualities on the third and fourth frequency sub-bands, and/or in response to the processor determining that the quality of the received signal has fallen below a second predetermined threshold level, control the signal receiver to subsequently output signals received in both the third and fourth frequency sub-bands.

The second controller may be configured to: (a) if the average channel quality on the third and fourth frequency sub-bands is determined to be higher than or equal to a first predetermined threshold level, control the signal receiver to subsequently combine the signals received in the third and fourth frequency sub-bands coherently; and/or (b) if the average channel quality on the third and fourth frequency sub-bands is determined to be lower than the first predetermined threshold level, control the signal receiver to subsequently combine the signals received in the third and fourth frequency sub-bands non-coherently.

The communications device may further comprise: a third controller responsive to the processor; and a message transmitter responsive to the third controller and operable to communicate data to the second counterpart communications device, the third controller being configured to: if the channel quality on the third frequency sub-band is determined to be more than a first predetermined threshold value higher than the channel quality on the fourth frequency sub-band, control the message transmitter to transmit a message to the second counterpart communications device indicating that subsequent transmissions to the currently claimed communications device should not include signals in the fourth frequency sub-band; and/or if the channel quality on the fourth frequency sub-band is determined to be more than the first predetermined threshold value higher than the channel quality on the third frequency sub-band, control the message transmitter to transmit a message to the second counterpart communications device indicating that subsequent transmissions to the currently claimed communications device should not include signals in the third frequency sub-band.

The message to the second counterpart communications device indicating that subsequent transmissions to the currently claimed communications device should not include signals in either the third or fourth frequency sub-band may also indicate that after the expiration of a predetermined time period the second counterpart communications device should resume transmission across both the third and fourth frequency sub-bands.

The message to the second counterpart communications device indicating that subsequent transmissions to the currently claimed communications device should not include signals in either the third or fourth frequency sub-band and that after the expiration of a predetermined time period the second counterpart communication device should resume transmission across both the third and fourth frequency sub-bands may also indicate that, on resumption of transmission across both the third and fourth frequency sub-bands, the second counterpart communications device should transmit one or more calibration diversity signals before transmitting any payload diversity signals.

The third controller may be configured to, after the expiration of a predetermined time period from the transmission of a message from the currently claimed communications device to the second counterpart communications device indicating that subsequent transmissions to the currently claimed communications device should not include signals in either the third or fourth frequency sub-band, and/or in response to the processor determining that the quality of the received signal has fallen below a second predetermined threshold level, control the message transmitter to transmit a message to the second counterpart communications device indicating that the second counterpart communications device should resume transmission across both the third and fourth frequency sub-bands.

The message to the second counterpart communications device indicating that the second counterpart communications device should resume transmission across both the third and fourth frequency sub-bands may also indicate that, on resumption of transmission across both the third and fourth frequency sub-bands, the second counterpart communications device should transmit one or more calibration diversity signals before transmitting any payload diversity signals.

According to a third aspect of the invention, there is provided a communications device for diversity communications may comprise: a diversity signal generator and transmitter as described above, and a diversity signal receiver as described above. The message receiver may be the signal receiver. The message transmitter may be the signal transmitter.

According to a fourth aspect of the invention, there is provided a system for diversity communications comprising a first communications device as described above, and a separate, second communications device as described above.

According to a fifth aspect of the invention, there is provided a method for diversity communications comprising transmitting and receiving diversity signals, wherein a diversity signal comprises: a first single coded signal spanning a first frequency sub-band, and a second single coded signal contemporaneous with the first single coded signal and spanning a second frequency sub-band offset from the first frequency sub-band such that the total bandwidth of the second diversity signal is greater than the bandwidths of either of the third and fourth frequency sub-bands alone; said first and second single coded signals each being such that, after undergoing a procedure comprising being: transmitted, received, shifted into a receiver frequency sub-band spanning a narrower bandwidth than the total bandwidth of the first diversity signal, and cross-correlated with a replica signal that is based on the transmitted signal a single significant peak corresponding to the most direct transmission path is produced.

These and other aspects of the present invention will now be described by way of example with reference to the detailed disclosure and the accompanying figures.

BRIEF DESCRIPTION OF THE DRAWINGS

The following disclosure will now be described by way of example with reference to the accompanying drawings. In the drawings:

FIG. 3 is a schematic of an example chirp transmitter device with FIG. 3(a), FIG. 3(b), and FIG. 3(b)(i) showing components of FIG. 3 in greater detail;

DETAILED DESCRIPTION

Figure 1:
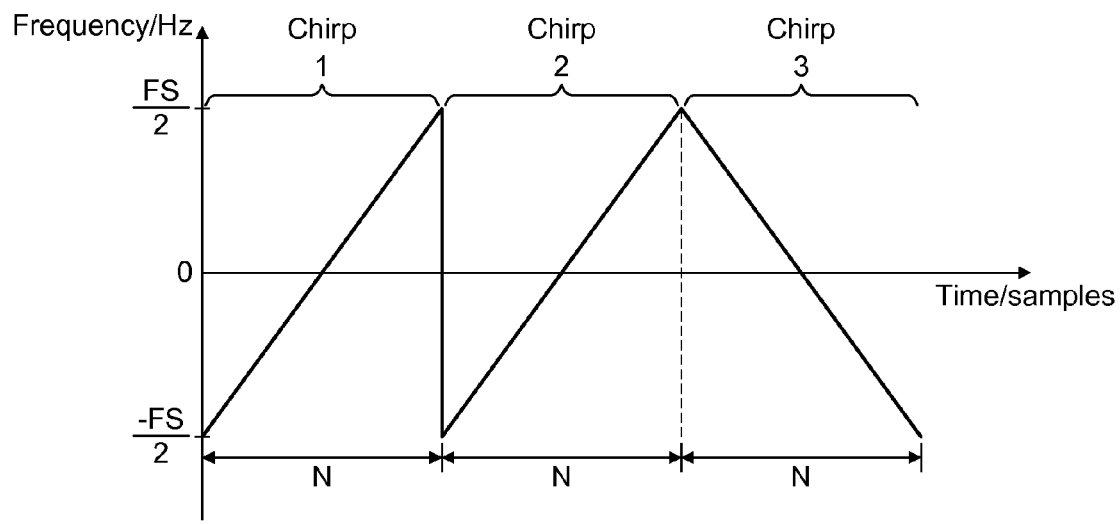
FIG. 1 illustrates a sequence of chirps in the frequency-time plane.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

There will now be set forth a method for diversity communications. This method comprises transmitting and receiving diversity signals. Each diversity signal is formed of a plurality of contemporaneous single coded signals in different frequency sub-bands.

Single coded signals being transmitted contemporaneously means that there is at least partial overlap in time between them. The greater the overlap the faster the data rate, thus the single coded signals may suitably have substantially the same durations and be simultaneous, such that there is substantially complete overlap between transmission of the single coded signals.

Since both fading and interference are frequency dependent, it is likely that even if one or more of the single coded signals comprised in each diversity signal suffers severe degradation between transmission and reception, others will be received substantially as transmitted and the message carried by the diversity signal may be decoded from them. The overall throughput of the communication link will therefore increase without the need for frequency hopping, antenna diversity or OFDM.

The quality of the signals received in each frequency sub-band may be compared to inform a diversity decision. Such a diversity decision may be to continue using all the frequency sub-bands as before, to weight their signals when determining payload data symbol values, or to exclude one or more sub-bands altogether. In this way the system may be made more efficient. In order to compare the frequency sub-bands it must be possible to distinguish between the signals received on each frequency sub-band. This may involve processing by the receiver device, and/or may be made possible by properties of the single coded signals themselves.

It should be possible to distinguish between the signals received on each frequency sub-band after those signals have been shifted into a single frequency sub-band with narrower bandwidth than the diversity signal. This allows subsequent processing such as correlation, decoding, making diversity decisions etc. to be done on a narrower band signal than would otherwise be the case, for example in an OFDM system.

Accordingly, the single coded signals may suitably have the following properties. Firstly, they should be suitable for autocorrelation after being transmitted and received. For example, they should have one or more features which make them easily distinguishable from noise after being propagated through an imperfect transmission medium. Secondly, they may be suitable for autocorrelation after being transmitted, received and conjugated. That is, the features which make them easily distinguishable from noise on reception are not lost during conjugation. Thirdly, they may be substantially orthogonal to their own conjugates. That is, when subjected to a frequency inversion, an inverted single diversity signal should have autocorrelation properties similar to the original non-inverted single diversity signal, and there should be poor cross-correlation between the original and inverted single diversity signals. Chirp signals can have all of these properties and will be used as exemplary coded signals in the remainder of this application. However the invention is not limited to using only chirp signals. For example M-codes, Gold-codes and other types of codes can have some or all of the above properties.

The chirp modulation method is a modulation method in which the frequency of a signal (chirp) varies linearly over time in a bandwidth. The bandwidth can be expressed as $F_s$; $F_s$ being a value in Hz. A chirp having a positive gradient in the frequency-time plane is generally referred to as an "up" or "forward" chirp, for example chirp 1 and chirp 2 on FIG. 1. A chirp having a negative gradient in the frequency-time plane is generally referred to as a "down" or "reverse" chirp, for example chirp 3 on FIG. 1.

A chirp can be represented by a sequence of N samples. One or more identical contiguous chirps can form a symbol that represents a data value to be communicated. In one protocol a chirp can be represented mathematically as:

$$R(g,v) = e^{j\pi g(n-f(v))(n+x-f(v))/N} |_{n=0 \text{ to } N-1} \quad (1)$$

where R is the received chirp sequence, which is normally evaluated for all integer values of n from 0 to N−1 in order, g is the gradient of the chirp, v is a symbol value, j is the square root of minus one, n is the sample index, $f(v)$ is a function that encodes v onto the chirp, which implicitly may also be a function of g, n, N and other constants, x is a constant, which may for example be set to N mod 2, and N is the total number of samples in the sequence. The number of valid values of v is the symbol set size, which is nominally N. However, in practice the symbol set size can be more or less than N depending on the quality of the link: for example, it might be advantageous to use fewer symbols if the link quality is poor. The value of |g| can have any value greater than 0 and less than N. Due to the modular nature of this expression negative gradients are obtained from N−1 backwards. Hence, a positive gradient of N−2 is equivalent to a negative gradient of −2. Where there are more than one identical contiguous chirps in a symbol, each chirp individually conveys the same value which is the symbol value of the symbol.

Chirp 1 in FIG. 1 has a starting frequency of $-F_s/2$ and a gradient of 1. It increases linearly in frequency over a period of N samples by $F_s$, to reach a frequency close to $+F_s/2$. Since this is a complex sampled system $+F_s/2$ is equivalent to $-F_s/2$. FIG. 1 illustrates an example in which two consecutive chirps have the same symbol value, whereas the third chirp is different. An apparent discontinuity in frequency between chirp 1 and chirp 2 occurs at n=N.

Figure 2:
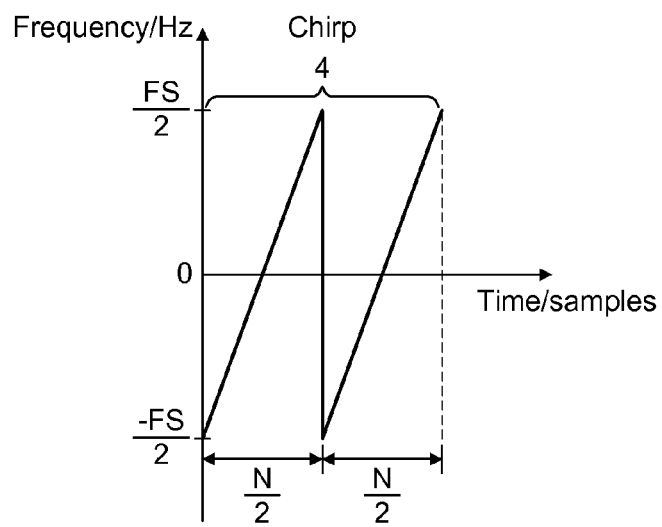
FIG. 2 illustrates a chirp having a gradient of 2 in the frequency-time plane.

Chirp 4 in FIG. 2 has a gradient of 2 and a starting frequency of $-F_s/2$. Because it has double the gradient of the chirps of FIG. 1, it increases linearly in frequency to $+F_s/2$ in half the number of samples that the chirps in FIG. 1 do, i.e. it reaches close to $+F_s/2$ after close to N/2 samples. The chirp then wraps around in frequency. Since this is a sampled system, these frequency wraps are in effect continuous and have continuous phase. The chirp repeats the frequency sweep from $-F_s/2$ to $+F_s/2$ between samples N/2 and N.

The chirps also have continuous frequency and phase from one end of the chirp to the other. A cyclic shift of the samples that make up a chirp creates another valid chirp in this example system.

Chirps can be used to encode data in a variety of ways. Binary data may be transmitted using up and down chirps to represent zeros and ones respectively (or vice-versa). M-ary data may be encoded using M different cyclic rotations of a chirp. A transmitter may convey its identity using a sequence of chirps having different gradients. Data may also be encoded in the gradients of Zadoff-Chu codes (where N is a prime number and complex-valued sequences having the property that cyclically shifted versions of the sequence imposed on a signal result in zero cross-correlation with one another at the receiver).

In a typical receiver configured to receive chirp signals, one or more correlators are used to correlate the received chirp with reference correlating chirps. The received chirp correlates strongly with a reference correlating chirp having the same gradient and symbol value, and weakly with all other chirps. Typically, the expected gradient of a received chirp is known to the receiver. For example, the receiver may be expecting a known sequence of chirps with known gradients as part of a synchronisation process.

In a conventional chirp receiver where the gradient of a received chirp signal is known to the receiver, a programmable correlator is used to correlate the received chirp with the expected reference correlating chirp. The reference and received chirp each comprise N samples, which could be in the order of hundreds or thousands of samples.

In the following the formation, transmission, reception and analysis of compound chirp signals comprising two single chirp signals is described. However, the invention may be implemented using other kinds of diversity signals as described above. In addition, the invention is not limited to dual coded signals. Diversity signals may be composed of more than two single coded signals. The greater the number of distinct single coded signals comprised in a diversity signal, the greater the effective bandwidth and the better the resulting increase in throughput. However, a balance should be found between the improvement in throughput achieved by increasing the number of single coded signals comprised in each diversity signal and the increased hardware and software complexity and power necessary to deal with such higher-order diversity signals.

Compound chirp signals may be transmitted by a transmitter device such as that shown schematically in FIG. 3. FIG. 3 shows exemplary components of a transmitter device 301 according to the methods described herein. This figure illustrates the layout of the transmitter device in terms of functional boxes. The operations of one or more of these functional boxes may be combined in the transmitter device or performed by separate components. It will be understood that this figure does not illustrate all those conventional components of a transmitter device known to a person skilled in the art.

Transmitter device ($T_xD$) 301 comprises a compound chirp generator (CCG) 302. Compound chirp generator 302 is configured to generate a first compound chirp signal comprising a first single chirp signal having a first time-frequency profile in a first frequency sub-band and at least a second single chirp signal having a second time-frequency profile, which may or may not match the first time-frequency profile, in a second frequency sub-band different to the first frequency sub-band. A chirp signal time-frequency profile is characterized by a particular gradient and duration of chirp. The time-frequency profiles of other coded signals may be characterized in other ways. If the first and second time-frequency profiles match, then the second single chirp signal has the same gradient and duration as the first. In either case the limits of the second chirp's frequency range (the start and end points of the chirp when plotted in frequency space) are different to those of the first chirp signal. The first and second frequency sub-bands are shifted with respect to each other by separation frequency Sep. Sep may be, for example, of the order 40 MHz.

Various methods and apparatus may be envisaged for the generation of compound chirp signals. An example which necessitates very little modification of a conventional radio transmitter is shown in FIG. 3(a).

Figure 4A:
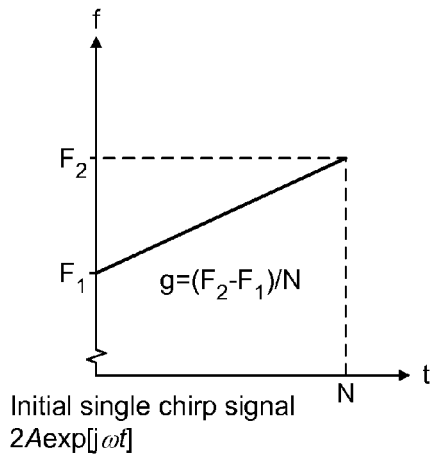
FIGS. 4(a)-4(d) illustrate the generation, transmission, reception and processing of an example diversity signal comprising two single chirps.

Compound chirp generator (CCG) 302a comprises a single chirp generator (SCG) 304a controlled by a programmable control unit (PCU) 303a to generate an initial single chirp signal having gradient g, with lower and upper limit frequencies of $F_1$ and $F_2$ respectively as shown in FIG. 4(a). This initial single chirp signal may be represented by $2A\exp[j\omega t]$ where A is an amplitude constant, ω describes the frequency variation and t is time. Note that ω is not simply a constant; the signals described are chirps not tones. The form of ω has been omitted to simplify the mathematical exposition of signal processing which follows.

Figure 4B:
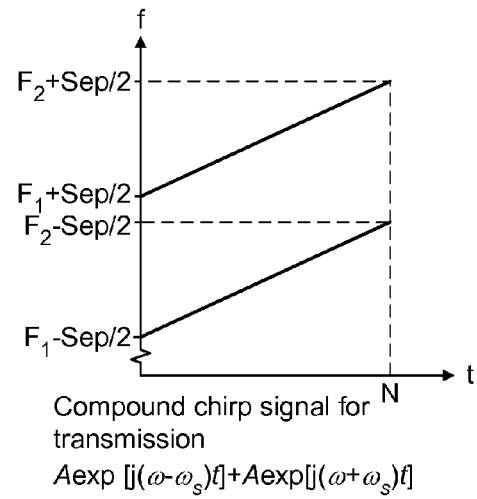

The initial single chirp signal is fed into a frequency mixer 305a. The frequency mixer 305a may then mix the initial single chirp signal with a tone having an intermediate frequency Sep/2 such that a compound chirp signal is produced as shown in FIG. 4(b), comprising a first single chirp and a second single chirp, frequency shifted from the initial single chirp signal by minus and plus Sep/2 respectively. The first compound chirp signal may be represented as $A\exp[j(\omega-\omega_s)t]+A\exp[j(\omega+\omega_s)t]$ where $\omega_s=2\pi\cdot\text{Sep}/2$.

Conventionally when radio signals are mixed by intermediate frequencies the image is rejected, typically using filters; in this case it is deliberately kept and used to introduce diversity. Thus this method could make use of a conventional radio transmitter with the image rejection circuitry for an appropriate mixer omitted, disconnected, disabled or set to a wider pass-band than normal, and the mixing frequency set to half the desired separation frequency.

Although it is not desired to filter out the image in this case, filters may still be included as appropriate to filter out artefacts due to non-ideal implementations. For example it may be more practical to use a square wave as the mixer frequency instead of a pure tone, in which case it may be preferable to include a filter to clean up the resulting signal.

If a higher order compound chirp is required, then additional mixers could be used, for example a compound chirp comprising 4 single chirps could be produced by mixing a dual chirp such as that produced in the method above.

Alternatively, chirps could be generated and combined digitally using an IQ-modulator as shown in FIG. 3(b). In this case, compound chirp generator (CCG) 302b comprises an IQ modulator (IQmod) 304b which generates single chirps consecutively, according to control signals from programmable control unit (PCU) 303b. These are then oversampled and mixed to different frequency bands by mixing unit ($M_xU$) 305b, then added to an accumulator buffer (+Buf) 306b. The oversampled rate of code generation is suitably high enough to ensure that the digital mixing process does not cause frequency aliasing. Once all the chirps have been added to the buffer its contents is transmitted. In this manner, compound chirps may be formed from any number of single chirps.

If the digital method is implemented, two buffers could be used as shown in accumulator buffer (+Buf) 306bi of FIG. 3(b)(i). This would allow one buffer (B1) to be prepared whilst the other (B2) is being output. Once the output buffer is empty the functions of the two buffers could be swapped as shown by the dotted lines.

As an example, if chirps are generated at a rate of 1 MHz, and oversampled by a factor of 80 (e.g. to cover the full ISM band at 2.4 GHz), and low-pass filtered with a 0.5 MHz cut-off, the resultant 80 MHz complex signal would comprise a chirp centered at baseband (DC), but with frequency components ranging from DC−0.5 MHz to DC+0.5 MHz. This can be mixed to any frequency band from DC−40 MHz to DC+40 MHz. Subsequent chirps could then be added at arbitrary frequencies.

Such a signal could be transmitted by a radio with a bandwidth of 80 MHz. The receiver may have a narrower bandwidth than the transmitter. One or more mixers may selectively overlay one or more signals from one or more frequency bands, to create a single narrow-band composite signal. This narrow-band signal may require less memory and slower clocks than a wide-band signal and may therefore be appropriate for low power and low data rate communications, such as chirp communications. The coding applied to each transmitted signal may allow a digital correlator, in the receiver, to distinguish each signal in the composite signal. A processing unit may determine the quality of each signal in the composite signal and then determines which associated frequency bands to select for subsequently received signals.

The frequency mixer method will likely to be cheaper and simpler to implement than the IQ-modulation method. However, the IQ-modulation method allows compound chirps to be easily formed of greater than 2 single chirps, which allows for a more precise analysis of channel quality by a receiver device. Optionally, both methods may be used. That is, an initial set of frequency-spaced single chirps could be generated using the IQ-modulation method, then these could be passed through an analogue frequency mixer to double the number of individual chirps comprised in the final compound chirp signal.

Once the first compound chirp signal has been generated it is passed to a signal transmitter ($T_x$) 307 for transmission. Signal transmitter 307 may comprise one or more amplifiers, RF mixers, filters etc.

Figure 5:
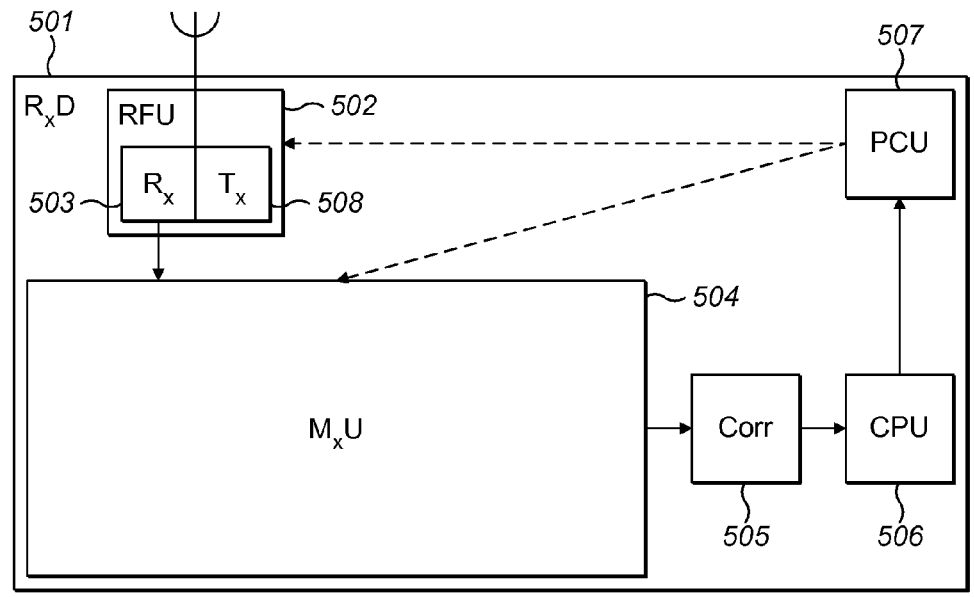
FIG. 5 is a schematic of an example chirp receiver device with FIG. 5(*i*) showing components of FIG. 5 in greater detail.
Figure 5I:
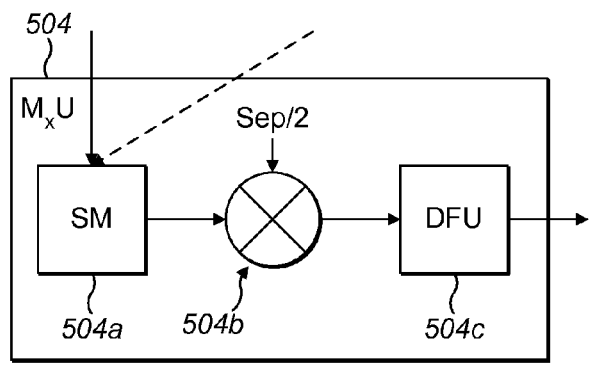

Compound chirp signals may be received by a receiver device such as that shown schematically in FIG. 5. FIG. 5 shows exemplary components of a receiver device ($R_xD$) 501 according to the methods described herein. This figure illustrates the layout of the receiver device in terms of functional boxes. The operations of one or more of these functional boxes may be combined in the receiver device or performed by separate components. It will be understood that this figure does not illustrate all those conventional components of a receiver device known to a person skilled in the art.

Conventionally, when multiple signals need to be received simultaneously by a single communications device for diversity purposes or otherwise, that communications device has a corresponding number of receive chains. For example if frequency diversity is used, multiple signals in different frequency sub-bands are received simultaneously by feeding the signal received at the antenna into a corresponding number of receive chains, each starting with a filter whose pass-band corresponds to one of the frequency sub-bands. However, the nature of compound chirp signals allows the single chirps comprised in them to be received simultaneously by a single receive chain if they are processed according to the method below. This can facilitate significant size and cost savings over conventional frequency diversity receivers.

Receiver device 501 comprises a radio frequency unit (RFU) 502 with signal receiver ($R_x$) 503. Signal receiver 503 may comprise one or more filters, amplifiers, baseband mixers etc. On receiving compound chirps such as those transmitted by transmitter devices similar to transmitter device 301 located within range of receiver device 501, signal receiver 503 outputs compound chirps such as that shown in FIG. 4(c). This compound chirp signal may be represented as $A_1\exp[j(\omega-\omega_s)t]+A_2\exp[j(\omega+\omega_s)t]$ where $A_1$ and $A_2$ account for attenuation of the signal through propagation in the lower and upper frequency sub-bands respectively.

Figure 4C:
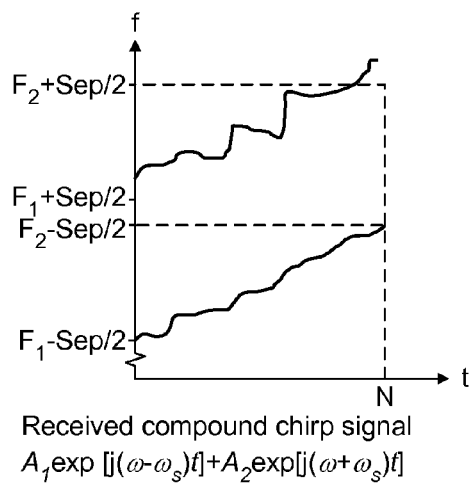

Note that FIG. 4(c) is not identical to FIG. 4(b) since the compound chirp signal is degraded and/or distorted by the effects of noise, fades and interference in the path between its transmission and reception. One of the first and second single chirp signals is likely to suffer these effects to a greater degree than the other since they are located in different frequency sub-bands.

The received compound chirp signal, (having already been amplified and/or mixed down to baseband and/or filtered by the signal receiver 503 as appropriate) is input to a mixer unit ($M_xU$) 504. Mixer unit 504 may be configured to output signals derived from the lower frequency sub-band signal, the higher frequency sub-band signal, or both. Mixer unit 504 may for example operate as illustrated at 504$i$ in FIG. 5($i$) and described below.

The compound chirp signal is first input to signal modifier (SM) 504a. Signal modifier 504a may then do one of three things:

(i) pass the signal to mixer 504b without modifying it, providing mixer 504b with an input signal of the form $$A_1\exp[j(\omega-\omega_s)t]+A_2\exp[j(\omega+\omega_s)t]; \qquad (2)$$

(ii) conjugate the signal before passing it to mixer 504b, providing mixer 504b with an input signal of the form $$A_1\exp[-j(\omega-\omega_s)t]+A_2\exp[-j(\omega+\omega_st]; \text{ or} \qquad (3)$$

(iii) take only the real part of the signal before passing it to mixer 504b, providing mixer 504b with an input signal of the form $$A_1\cos[(\omega-\omega_s)t]+A_2\cos[(\omega+\omega_s)t] \qquad (4)$$

Mode (iii) could be a default setting.

Mixer 504b then mixes the signal by Sep/2, essentially performing a complex multiplication by $\exp[j\omega_s t]$ on the signal passed to it by signal modifier 504a to mix the desired signal components into the pass-band of digital filter 504c. The three different signals which can be passed to digital filter 504c are thus:

for case (i)

$$\{A_1\exp[j(\omega-\omega_s)t]+A_2\exp[j(\omega+\omega_s)t]\}\cdot\exp[j\omega_s t]=A_1\exp[j\omega t]+A_2\exp[j(\omega+2\omega_s)t] \qquad (5)$$

i.e. a forward chirp at the baseband frequency, and another forward chirp Sep above the baseband frequency; for case (ii)

$$\{A_1\exp[-j(\omega-\omega_s)t]+A_2\exp[-j(\omega+\omega_s)t]\}\cdot\exp[j\omega_s t]=A_1\exp[-j(\omega-2\omega_s)t]+A_2\exp[-j\omega t] \qquad (6)$$

i.e. a reverse chirp at Sep above the baseband frequency, and another reverse chirp at the baseband frequency; and for case (iii)

$$\{A_1\cos[(\omega-\omega_s)t]+A_2\cos[(\omega+\omega_s)t]\}\cdot\exp[j\omega_s t]=\frac{1}{2}\{A_1\exp[j\omega t]+A_2\exp[j(\omega+2\omega_s)t]+A_1\exp[-j(\omega-2\omega_s)t]+A_2\exp[-j\omega t]\} \qquad (7)$$

i.e. half-magnitude forward and reverse chirps both at the baseband frequency and at Sep above the baseband frequency.

Figure 4D:
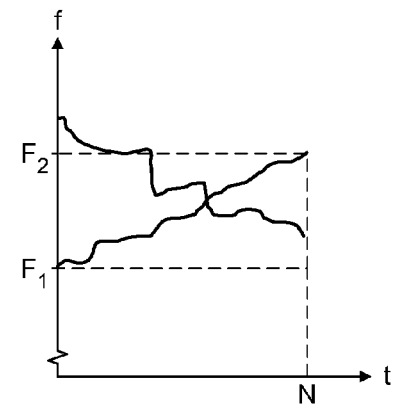

Digital filter 504c then digitizes the signal and filters out any signals not within its baseband pass-band (i.e. the chirps at baseband+Sep). Thus, in case (i) only the signal originating from that received in the lower frequency sub-band is passed on to correlating unit 505; in case (ii) only the signal originating from that received in the higher frequency sub-band is passed on to correlating unit 505; and in case (iii) both of the signals are passed on to correlating unit 505 as shown in FIG. 4(d).

Correlating unit 505 may comprise two correlators; one to correlate the digitized signal against the expected forward chirp having gradient g as shown in FIG. 4(a), and another to correlate the digitized signal against the expected reverse chirp which has the same duration as the expected forward chirp and spans the same frequency sub-band, but has gradient −g. Alternatively, correlating unit 505 may comprise a single correlator capable of performing both correlations in parallel, such as that described in the applicant/assignee's co-pending UK patent application publication number 2490140.

Figure 6:
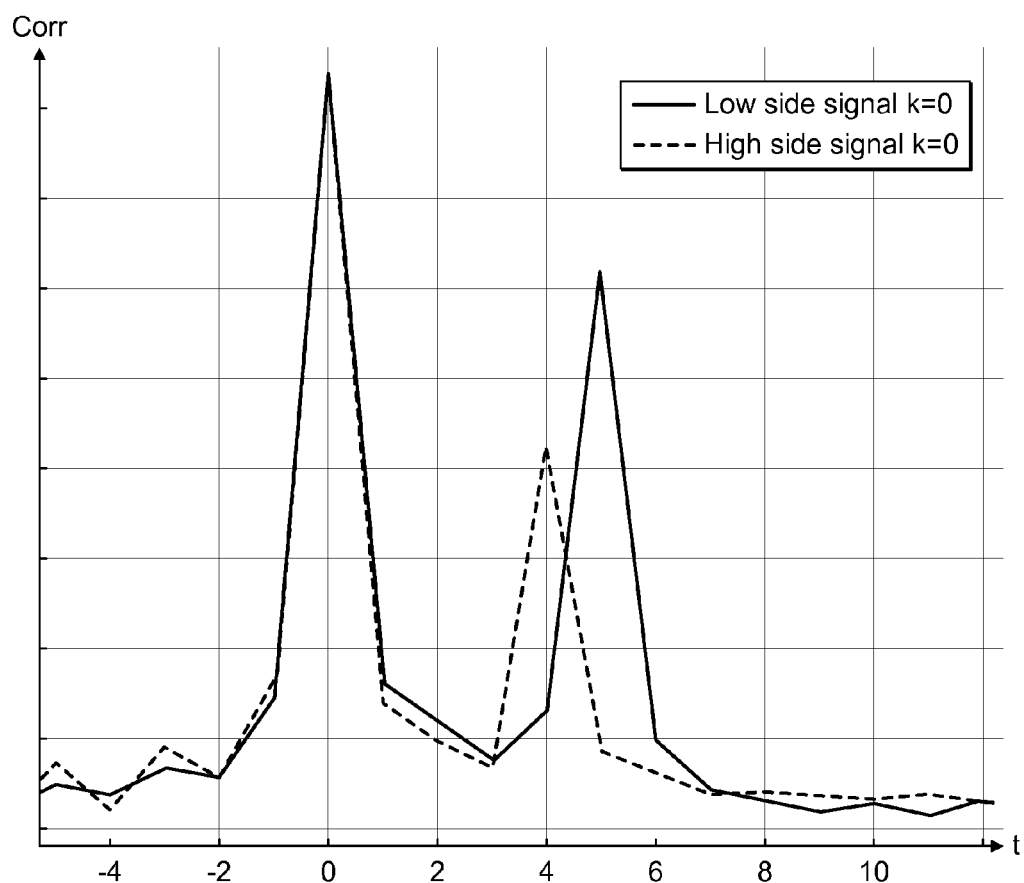
FIG. 6 shows example correlation results.

The correlation results may be, for example, similar to those shown in FIG. 6 for a test simulation in which mixer unit 504 had operated according to mode (iii). The vertical axis shows correlation magnitude and the horizontal axis time from reception of the direct path transmission in samples. The solid line shows the forward chirp correlation results and the broken line the reverse chirp correlation results. It can be seen that in this case frequency-dependent fading as between the two frequency sub-bands was present to a much greater degree than frequency-dependent interference. The largest peak in each plot corresponds to the direct path transmission; in this case these coincide and are of approximately equal magnitude. The smaller peaks correspond to reflections. In this case the correlation peak corresponding to the strongest reflection of the lower frequency sub-band single chirp comprised in the received compound chirp signal is recorded later than that corresponding to the strongest reflection of the higher frequency sub-band single chirp comprised in the received compound chirp signal. This indicates that the path taken by the strongest reflection of the lower frequency sub-band single chirp comprised in the received compound chirp signal was longer than the path taken by the strongest reflection of the higher frequency sub-band single chirp comprised in the received compound chirp signal. The former peak is also smaller than the latter, indicating that the higher frequency sub-band suffered more fading-related attenuation than the lower frequency sub-band.

Correlation results such as those shown in FIG. 6 can be passed to a processor (CPU) 506 which compares the two sets of correlation results and accordingly determines whether transmissions in one of the lower and higher frequency sub-bands are experiencing fading and/or interference to a significantly greater extent than transmissions in the other frequency sub-band. The qualities of the two frequency sub-bands may be compared, for example, using measurements of signal-to-noise ratio (SNR) in the correlation results.

The SNR can be calculated from the magnitude of the correlation results after multipath, timing and frequency error artefacts have been removed. For example, this may mean removing some of the correlator result bins from the subsequent calculation. The SNR is a measure of the signal power divided by the noise power. The signal power can be estimated from the magnitude of the largest correlation peak squared, less the mean noise power. The mean noise power can be estimated from the mean of the squares of the correlation output excluding the peak. The noise power is the sum of the squares of the whole correlator output minus the signal power. (This method assumes that the largest correlator output is the correct symbol.)

Alternatively, bit error rate (BER) could be determined. Processor 506 may then pass its findings to a controller (PCU) 508 which can decide accordingly whether any action is necessary, and if so issue appropriate control signals.

For example, if the qualities of the frequency sub-bands do not differ significantly, it may be preferable to continue receiving in both (i.e. with the mixer unit 504 operating according to mode (iii)) as the SNR is likely to be higher when the signals received in each of the frequency sub-bands are combined. The combination could be done coherently or non-coherently depending on the SNR. If the SNR is high (for example higher than a predetermined threshold SNR) then the combination could be done coherently. If the SNR is low (for example lower than or equal to the predetermined threshold SNR) then the combination could be done non-coherently, for example by adding the correlation magnitude results.

Conversely, where one frequency sub-band significantly outperforms the other (for example where the SNRs of the signals received in them differ by more than a predetermined threshold value) it may be preferable to cut out the weaker sub-band altogether. The SNR on the remaining sub-band(s) could still be monitored and if it drops below a predetermined threshold value then the excluded sub-band could be reinstated. Such exclusion and/or reinstatement of sub-bands may be done by controller 507 controlling the receiver, for example by switching in appropriate receive filters at any point in the receive chain.

Alternatively/additionally, the mixer unit 504 may be controlled by controller 508 to process the received signal in such a way as to exclude one or other of the lower and higher frequency sub-band single chirps comprised in the received dual chirp from the correlator input. Controller 507 may issue a three-level control signal, for example with a low value (e.g. −1) indicating that only the single chirp received in the lower sub-band should be passed (for example, mode (i) should be used), a high value (e.g. +1) indicating that only the single chirp received in the higher sub-band should be passed (for example, mode (ii) should be used), and a neutral value (e.g. 0) indicating that both single chirps should be passed (for example, mode (iii) should be used).

Alternatively/additionally, receiver device 501 may optionally comprise a message transmitter ($T_x$) 508 configured for communication with the device from which it has been receiving compound chirp signals. Controller 507 may control said message transmitter 508 to instruct the other device to stop including single chirps in a particular frequency sub-band in its compound chirp transmissions to receiver device 501 (where the compound chirps were dual chirps they consequently become single chirps). Such a message transmitter may have its own antenna, or may be comprised in RF unit 502, sharing an antenna with signal receiver 503 (using a single antenna may be preferable for small and/or inexpensive devices).

If the device transmitting compound chirp signals to receiver device 501 is transmitter device 301, and receiver device 501 comprises a message transmitter 508 for implementing the procedure described above, then transmitter device 301 should further comprise a message receiver ($R_x$) 308. Message receiver 308 may have its own antenna, or message receiver 308 and signal transmitter 307 may be comprised in an RF unit (RFU) 309 so that they may share an antenna (again, using a single antenna may be preferable for small and/or inexpensive devices). Message receiver 308 may then pass instructions received from receiver device 501 to a control unit 310 which is configured to control chirp generator 302 according to the instructions. Alternatively, control unit 310 may be configured to restrict transmission at signal transmitter 307, for example by switching in one or more filters. The former approach may reduce power consumption, whereas the latter approach may be a simple hardware alteration not requiring the use of so much processing power for software control.

Interference and fading environments often vary with time as the locations and activity of transmitting devices with respect to receiving devices and/or their surroundings change. Therefore it may be preferable, especially where one or both of receiver device 501 and transmitter device 301 are mobile, to occasionally resume full compound chirp communication in order to re-test frequency sub-band quality and adjust system settings accordingly. There may therefore be a pre-set interval from processor 506's determination of sub-band quality after which all the settings of the system are re-set to their initial configuration. That is, if signal receiver 503 has been set to filter its reception by frequency sub-band, those filters are switched out, and if chirp generator 302 has been set to not generate single chirps in a certain frequency sub-band it is re-set to generate full compound chirps. In the latter case the pre-set interval may be pre-set for transmitter device 301, or each instruction message may specify an appropriate interval set by receiver device 501 prior to transmission of the instruction message, or receiver device 501 may transmit a new instruction message to resume full compound chirp transmission after expiration of an appropriate interval. Appropriate intervals may be pre-determined or chosen on an ad-hoc basis, for example taking into account recent frequency sub-band quality measurements and/or results patterns, e.g. the SNR dropping below a threshold value as discussed above.

Instead of three distinct modes of operation in which the lower sub-band, the upper sub-band or both are used, both sub-bands could always be used but the received signal could be analysed and the frequency sub-bands weighted and combined accordingly. This technique could for example make use of an analogue multiplier such as a transistor driven by a digital to analogue converter. This weighting technique could be used together with sub-band quality thresholds as described above such that the weight given to a sub-band is zero if the SNR on that sub-band falls below a threshold value. In that case any of the techniques for cutting out a sub-band as described above could be used.

If the compound chirp signal comprises more than two single chirp signals, multiple parallel mixers may be used. Alternatively, in the case that the transmitted signal was formed using the combined method (i.e. an initial set of frequency-offset single chirps were generated using the IQ-modulation method, then passed through an analogue frequency mixer to double the number of individual chirps comprised in the final compound chirp signal), each of the two sets of chirps may be treated in a similar manner to that described for each of the two single chirps described above. Each remaining single chirp may then be selected in turn by mixing and filtering at an appropriate frequency band.

The first one or other particular number of full compound chirp signals transmitted in a system, on start-up and following timeout of a restricted transmission/reception interval, may be for calibration purposes only, that is they do not carry any payload data. These calibration compound chirps may be such that even if the quality of one or more of the frequency sub-bands on which the compound chirp signals are communicated is poor, no payload data is lost in the time it takes processor 506 to assess frequency sub-band quality and reduce or cut out the impact of any poorly performing frequency sub-bands.

Figure 7:
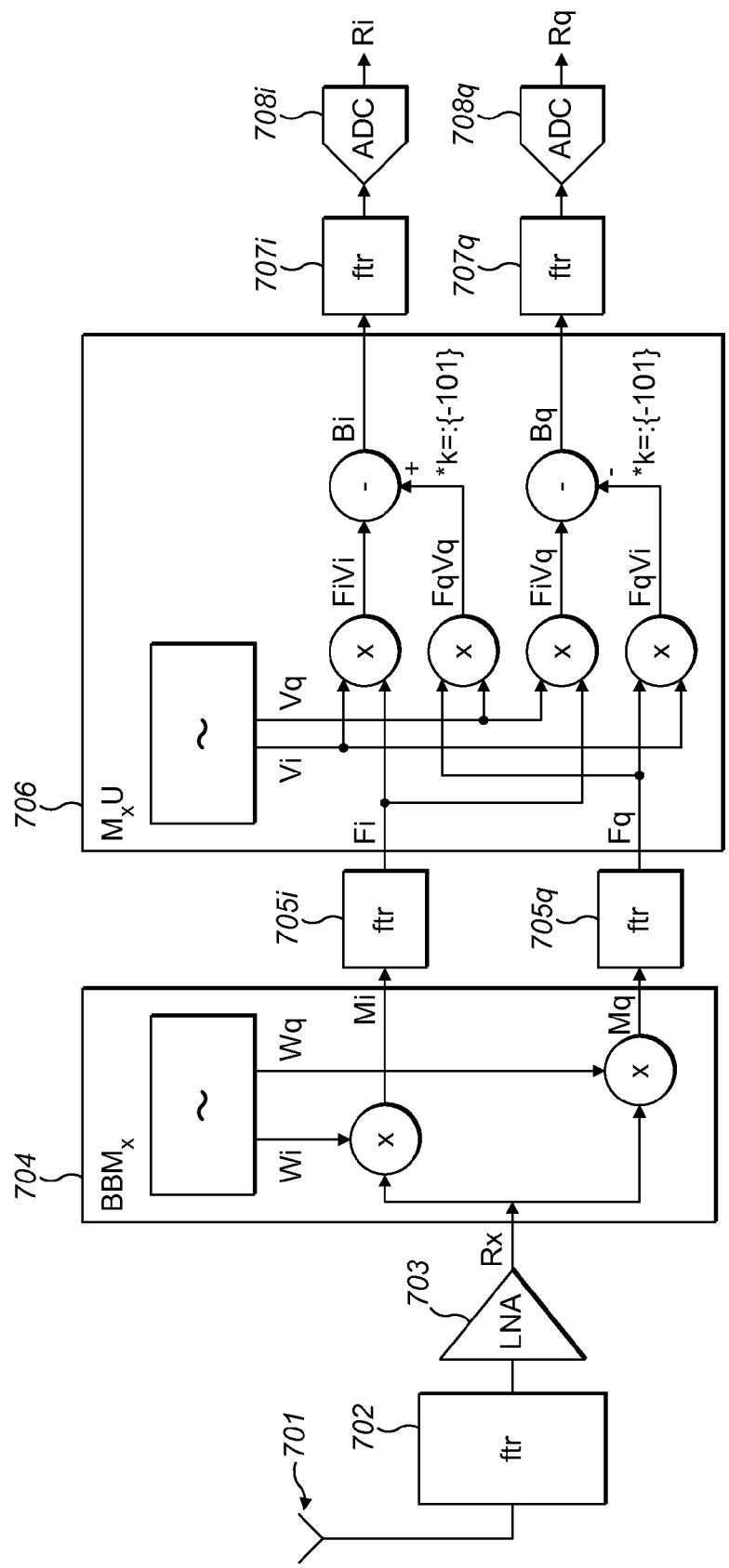
FIG. 7 is a schematic of an example receive chain.

The receive chain of receiver device 501 could be implemented using the example receive chain components shown in FIG. 7. The signal received by antenna 701 could be filtered by a filter (ftr) 702 to remove noise outside of the band in which the compound chirp signals are expected to be received. The pass-band of filter 702 might, for example, be around the 2.4 GHz ISM band. The output of filter 702 could be amplified by a low-noise amplifier (LNA) 703. The output of LNA 703 (Rx) could be mixed down to baseband by a baseband mixer ($BBM_x$) 704 which splits the signal into in-phase (Mi) and quadrature (Mq) components. These could be passed through filters 705$i$ and 705$q$ respectively to remove any noise generated by the amplification and/or mixing.

The outputs of filters 705$i$ and 705$q$ (Fi and Fq respectively) could be fed into a mixer unit ($M_xU$) 706 as shown which operates on its inputs with mixer frequency Sep/2 in one of three ways according to the value of a diversity select switch factor (k), which may take the values −1, 0 or 1. The outputs of mixer unit 706 (Bi and Bq) are then given by the following expressions:

$$Bi = Fi \cdot Vi + k \cdot Fq \cdot Vq \qquad (8)$$

$$Bq = Fi \cdot Vq - k \cdot Fq \cdot Vi \qquad (9)$$

Bi and Bq may then be filtered to remove any signal not at baseband by filters 707$i$ and 707$q$ respectively, and digitised by analogue-to-digital converters (ADC) 708$i$ and 708$q$ respectively. The output signals Ri and Rq may then be input to a correlator unit.

Figure 8:
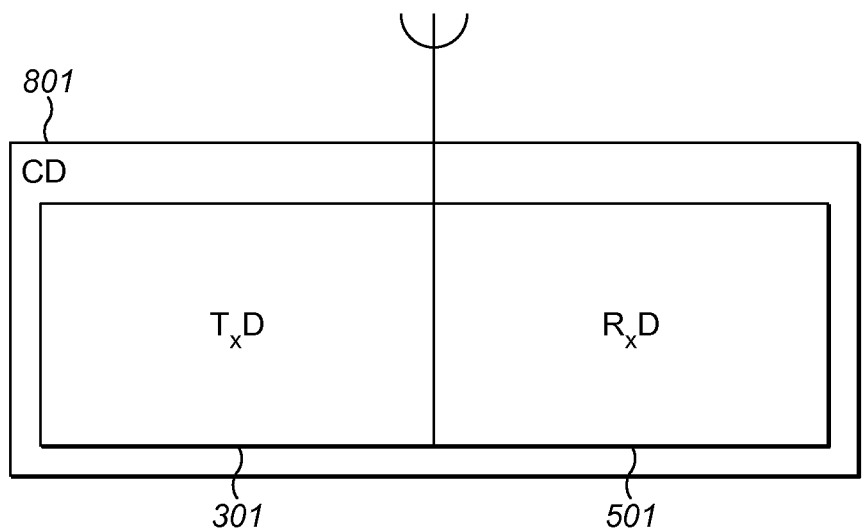
FIG. 8 is a schematic of an example chirp transceiver device.

Transmitter device 301 and receiver device 501 could be incorporated in one transceiver communication device (CD) 801 as shown in FIG. 8. This could consist of the transmitter and receiver devices fixed together with no modifications, or appropriate functional blocks could be shared between the transmit and receive sides of the device to minimize duplication. For example radio frequency circuitry (including an antenna) and a central processing unit could be shared.

Preferably, the receiver, transmitter and transceiver described herein are implemented in hardware. Alternatively, the receiver, transmitter and transceiver described herein may be implemented in software.

Suitably, a symbol comprises one or more identical chirp signals, wherein each chirp signal is represented by a sequence of N samples.

In a typical transmitter the chirps are converted into an analogue form and mixed up from baseband (e.g. ~16 MHz) to RF (e.g. ~2.4 GHz) before being transmitted. In a typical receiver the chirps are mixed from RF down to baseband and are quantized prior to decoding. In both cases the RF mixing and the mixing with Sep/2 described above may be done in either order. Typically, chirps are used for implementations that use a low data rate and low power. The transmitter and/or receiver and/or transceiver are suitable for use in high-sensitivity radio communications. Example implementations are in a temperature sensor, a walkie-talkie or a wireless headset. The spectrum used by such devices could for example be the "whitespace" of unlicensed frequency bands between licensed television channel bands.

In an alternative implementation a diversity signal may comprise two contemporaneous single coded signals which are distinguishable from one another in some respect other than the frequency sub-bands they span. This may result in lower processing requirements at the receiver.

In a first example, instead of the single coded signals comprised in the diversity signal being two single chirps having gradients with the same magnitude and sign, they may have gradients with the same magnitude but opposite signs. That is, one of the single chirp signals may be the reverse, or conjugate of the other. In this case some additional/different processing would be required at the transmitter, for example an additional conjugator unit may be provided in the compound chirp generator 302a, or different control signals may be issued by the PCU 303b in compound chirp generator 302b. However, no conjugation would be needed at the receiver to distinguish between the chirps; they could be mixed into the same frequency sub-band and then passed directly to the correlator. Therefore signal modifier 504a would not be required.

In a second example, the cyclic shifts of chirps comprised in the diversity signal may be used to distinguish them from one another. In this case, different control signals may be issued by the PCU 303b in compound chirp generator 302b. However, no conjugation would be needed at the receiver to distinguish between the chirps; they could be mixed into the same frequency sub-band and then passed directly to the correlator. Therefore signal modifier 504a would not be required. In addition, in this case only one correlation would be required as a peak would appear for each single chirp signal at a different cyclic shift in a single set of correlation results. To ensure such peaks are distinguishable from one another, they should be spaced apart by suitably spacing the cyclic shifts of the single chirps generated at the transmitter. For example, if the diversity signal comprises two single chirps, their cyclic shifts could suitably be spaced apart by a quarter of a cycle. In this case the cyclic shifts of the chirps could not be used to encode payload data; if the system generally communicates payload data using the cyclic shifts of chirps then such diversity signals would be for calibration purposes only.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communications device for diversity communications comprising:
    a diversity signal receiver configured to receive a first diversity signal transmitted by a second counterpart communication device, said first diversity signal comprising:
        a first single coded signal spanning a first frequency sub-band and forming at least one symbol representing a data value to be transmitted, and
        a second single coded signal forming at least one symbol representing a data value to be transmitted, the second coded signal having been transmitted contemporaneously with the first single coded signal and spanning a second frequency sub-band offset from the first frequency sub-band such that the total bandwidth of the first diversity signal is greater than the bandwidths of either of the first and second frequency sub-bands alone;
    the receiver being further configured to shift a received first diversity signal into a receiver frequency sub-band spanning a narrower bandwidth than the total bandwidth of the first diversity signal; and
    a correlating unit configured to cross-correlate a signal derived from the first diversity signal with a replica signal based on the transmitted signal to produce a single significant correlation peak corresponding to a most direct transmission path.

2. A communications device as claimed in claim 1, wherein the first and second single coded signals have substantially the same durations.

3. A communications device as claimed in claim 1, wherein the first and second single coded signals are chirps.

4. A communications device as claimed in claim 1, wherein for one of the first and second single coded signals further comprises conjugation.

5. A communications device as claimed in claim 4, wherein the said one of the first and second single coded signals is substantially orthogonal to its own conjugate.

6. A communications device as claimed in claim 1, wherein for one of the first and second single coded signals further comprises discarding an imaginary part of a complex signal.

7. A communication device as claimed in claim 3, wherein the first and second single coded signals have different cyclic shifts, the difference in cyclic shift between the first and second single coded signals being a quarter of a cycle.

8. A communications device as claimed in claim 1, further comprising a mixer unit configured to:
    receive output from the receiver; and
    output a signal comprising:
        a component derived from the first single coded signal multiplied by a first weighting factor, and
        a component derived from the second single coded signal multiplied by a second weighting factor.

9. A communications device as claimed in claim 8, wherein the first and second weighting factors may each take a continuous range of values from zero to one.

10. A communications device as claimed in claim 8, wherein the first and second weighting factors may each respectively take only the value zero or the value one.

11. A communications device as claimed in claim 8, wherein the mixer unit comprises:
    a signal modifier configured to operate in a mode selected from:
        (i) first band mode, in which the signal modifier is configured to output the first diversity signal or signal derived from said first diversity signal unchanged;
        (ii) second band mode, in which the signal modifier is configured to output the conjugate of the first diversity signal or signal derived from said first diversity signal; and
        (iii) combined mode, in which the signal modifier is configured to output only a real part of the first diversity signal or signal derived from said first diversity signal;
    a mixer configured to mix together the output of the signal modifier with a signal having a frequency equal to half the frequency offset between the first and second frequency sub-bands; and
    a filter configured to output only signals within a certain frequency band such that:
        when the signal modifier operates in first band mode, the filter outputs a signal derived from only the first single coded signal;
        when the signal modifier operates in second band mode, the filter outputs a signal derived from only the second single coded signal; and when the signal modifier operates in combined mode, the filter outputs a signal having components derived from both the first and second single coded signals.

12. A communications device as claimed in claim 8, wherein the first and second weighting factors are determined according to one or more measurements of channel quality on the first and second frequency sub-bands respectively.

13. A communications device as claimed in claim 8, wherein the correlating unit comprises:
   a first correlator configured to output a first set of correlation results formed by correlating the output of the mixer unit with a single coded signal substantially identical to the transmitted version of the first single coded signal; and
   a second correlator configured to output a second set of correlation results formed by correlating the output of the mixer unit with a single coded signal substantially identical to the conjugate of the transmitted version of the first single coded signal.

14. A communications device as claimed in claim 13, wherein the first and second weighting factors are determined according to one or more measurements of channel quality on the first and second frequency sub-bands respectively; and
   further comprising a processor configured to measure the channel quality on at least one of the first and second frequency sub-bands by analysing at least one of the first and second sets of correlation results respectively.

15. A communications device as claimed in claim 11, wherein the first and second weighting factors are determined according to one or more measurements of channel quality on the first and second frequency sub-bands respectively; and wherein the correlating unit comprises:
   a first correlator configured to output a first set of correlation results formed by correlating the output of the mixer unit with a single coded signal substantially identical to the transmitted version of the first single coded signal; and
   a second correlator configured to output a second set of correlation results formed by correlating the output of the mixer unit with a single coded signal substantially identical to the conjugate of the transmitted version of the first single coded signal;
   the communications device further comprising:
   a processor configured to measure the channel quality on at least one of the first and second frequency sub-bands by analysing at least one of the first and second sets of correlation results respectively; and
   a first controller responsive to the processor and operable to control the mixer unit, configured to:
   (i) if the channel quality on the first frequency sub-band is determined to be greater than or equal to a first predetermined threshold value higher than the channel quality on the second frequency sub-band, control the mixer unit to operate in first band mode; and/or
   (ii) if the channel quality on the second frequency sub-band is determined to be greater than or equal to the first predetermined threshold value higher than the channel quality on the first frequency sub-band, control the mixer unit to operate in second band mode; and/or
   (iii) if the channel qualities on the first and second frequency sub-bands are determined to be within the first predetermined threshold value of each other, control the mixer unit to operate in combined mode.

16. A communications device as claimed in claim 15, wherein the first controller is configured to control the mixer unit to operate in combined mode at at least one of, after the expiration of a predetermined time period from the determination of the channel qualities on the first and second frequency sub-bands, and in response to the processor determining that the quality of the received signal has fallen below a second predetermined threshold level.

17. A communications device as claimed in claim 14, further comprising a first controller responsive to the processor and operable to control the signal receiver, configured to perform at least one of:
   (i) if the channel quality on the first frequency sub-band is determined to be greater than or equal to a first predetermined threshold value higher than the channel quality on the second frequency sub-band, control the signal receiver to subsequently not output signals received in the second frequency sub-band; and
   (ii) if the channel quality on the second frequency sub-band is determined to be greater than or equal to the first predetermined threshold value higher than the channel quality on the first frequency sub-band, control the signal receiver to subsequently not output signals received in the first frequency sub-band; and
   (iii) if the channel qualities on the first and second frequency sub-bands are determined to be within the first predetermined threshold value of each other, control the signal receiver to subsequently output signals received in both the first and second frequency sub-bands.

18. A communications device as claimed in claim 17, wherein the first controller is configured to control the signal receiver to subsequently output signals received in both the first and second frequency sub-bands at at least one of:
   (i) after the expiration of a predetermined time period from the determination of the channel qualities on the first and second frequency sub-bands, in response to the processor determining that the quality of the received signal has fallen below a second predetermined threshold level; or
   (ii) after the expiration of a predetermined time period from the determination of the channel qualities on the first and second frequency sub-bands; or
   (iii) in response to the processor determining that the quality of the received signal has fallen below a second predetermined threshold level.

19. A method for diversity communications comprising:
   transmitting from a first communication device a diversity signal comprising:
      a first single coded signal spanning a first frequency sub-band and forming at least one symbol representing a data value to be transmitted, and
      a second single coded signal forming at least one symbol representing a data value to be transmitted, the second coded signal being contemporaneous with the first single coded signal and spanning a second frequency sub-band offset from the first frequency sub-band such that the total bandwidth of the second diversity signal is greater than the bandwidths of either of the first and second frequency sub-bands alone;
   performing a procedure at a second communication device comprising the steps of:
      receiving the transmitted diversity signal;
      shifting the diversity into a receiver frequency sub-band spanning a narrower bandwidth than the total bandwidth of the received diversity signal; and
      cross-correlating the shifted signal with a replica signal that is based on the transmitted diversity signal to generate a single significant correlation peak corresponding to a most direct transmission path.

\* \* \* \* \*